United States Patent
Xie et al.

(10) Patent No.: US 11,636,155 B2
(45) Date of Patent: Apr. 25, 2023

(54) METHOD AND APPARATUS FOR DATA SEARCH, SYSTEM, DEVICE AND COMPUTER READABLE STORAGE MEDIUM

(71) Applicant: Baidu Online Network Technology (Beijing) Co., Ltd., Beijing (CN)

(72) Inventors: Da Xie, Beijing (CN); Biao Fan, Beijing (CN); Zhixun Zheng, Beijing (CN); Jiajie Chen, Beijing (CN); Xiaoyong Lv, Beijing (CN); Zhen Zhen, Beijing (CN); Duo Li, Beijing (CN); Chong Sun, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/169,661

(22) Filed: Feb. 8, 2021

(65) Prior Publication Data
US 2022/0075828 A1   Mar. 10, 2022

(30) Foreign Application Priority Data
Sep. 8, 2020 (CN) .......................... 202010937376.0

(51) Int. Cl.
*G06F 16/9032* (2019.01)
*G06F 16/903* (2019.01)
(Continued)

(52) U.S. Cl.
CPC ...... *G06F 16/90332* (2019.01); *G06F 16/904* (2019.01); *G06F 16/9038* (2019.01); *G06F 16/90335* (2019.01)

(58) Field of Classification Search
CPC .... G06F 16/215; G06F 16/2365; G06F 16/29; G06F 16/90332; G06F 16/90335; G06F 16/9038; G06F 16/904
See application file for complete search history.

(56) References Cited

U.S. PATENT DOCUMENTS

| | | |
|---|---|---|
| 2002/0078300 A1 | 6/2002 | Dharap |
| 2017/0255681 A1 | 9/2017 | Giunio-Zorkin |

(Continued)

FOREIGN PATENT DOCUMENTS

| | | |
|---|---|---|
| CN | 102117320 A | 7/2011 |
| CN | 104239513 A | 12/2014 |

(Continued)

OTHER PUBLICATIONS

European Patent Office, Extended European Search Report dated Jul. 27, 2021 for application No. EP21154906.8.

*Primary Examiner* — Taelor Kim
(74) *Attorney, Agent, or Firm* — Houtteman Law LLC (57) ABSTRACT

The present disclosure provides a data search method, and relates to the field of computer technology. The method includes determining semantic-understanding information corresponding to a received search term by subjecting the search term to semantic understanding; analyzing the semantic-understanding information to obtain timeliness requirement information of the search term; determining an acquisition mode of resource result corresponding to the search term based on the timeliness requirement information of the search term; and obtaining the resource result corresponding to the search term by using the determined acquisition mode. The present disclosure further provides a data search apparatus, a system, a device, and a computer readable storage medium.

16 Claims, 4 Drawing Sheets

(51) Int. Cl.
  *G06F 16/9038*   (2019.01)
  *G06F 16/904*    (2019.01)

(56) References Cited

U.S. PATENT DOCUMENTS

2020/0065424 A1    2/2020  Ananthapur Bache et al.
2021/0286782 A1*   9/2021  Obinata ................ G06F 16/215

FOREIGN PATENT DOCUMENTS

| CN | 107180093 A  | 9/2017 |
| CN | 109670019 A  | 4/2019 |
| CN | 111310017 A  | 6/2020 |
| JP | 2003-015938 A | 1/2003 |
| JP | 2015-060568 A | 3/2015 |
| JP | 2016-212498 A | 12/2016 |
| WO | 2020124444 A1 | 6/2020 |

* cited by examiner

METHOD AND APPARATUS FOR DATA SEARCH, SYSTEM, DEVICE AND COMPUTER READABLE STORAGE MEDIUM

CROSS-REFERENCE TO RELATED APPLICATIONS

This application is based on and claims priority from Chinese Patent Application No. 202010937376.0 filed on Sep. 8, 2020, the disclosure of which is herein incorporated by reference in its entirety.

TECHNICAL FIELD

The present disclosure relates to the field of computer technology, and in particular, to a method and an apparatus for data search, a system, a device, and a non-transitory computer readable storage medium.

BACKGROUND

In a process of using a search engine to search, a fixed expiration time is usually set for a resource corresponding to a search result, and a new resource will be retrieved from a back end by penetrating a cache when the expiration time is reached. However, the searches based on fixed expiration times face a conflict between a machine cost of a search engine and the timeliness of search results.

SUMMARY

The embodiments of the present disclosure provide a method and an apparatus for data search, a system, a device and a non-transitory computer readable storage medium.

In a first aspect, an embodiment of the present disclosure provides a data search method, including determining semantic-understanding information corresponding to a received search term by subjecting the search term to semantic understanding; analyzing the semantic-understanding information to obtain timeliness requirement information of the search term; determining an acquisition mode of resource result corresponding to the search term based on the timeliness requirement information of the search term; and obtaining the resource result corresponding to the search term by using the determined acquisition mode.

In a second aspect, an embodiment of the present disclosure provides a data search apparatus, including an information acquisition module configured to determine semantic-understanding information corresponding to a received search term by subjecting the search term to semantic understanding; an information analysis module configured to analyze the semantic-understanding information to obtain timeliness requirement information of the search term; a mode determining module configured to determine an acquisition mode of resource result corresponding to the search term based on the timeliness requirement information of the search term; and a result obtaining module configured to obtain the resource result corresponding to the search term by using the determined acquisition mode.

In a third aspect, an embodiment of the present disclosure provides an information service system, including an input module configured to receive an input search term; and a processing module configured to perform the above data search method on the received search term, and obtain an acquisition mode of resource result corresponding to the search term and the resource result.

In a fourth aspect, an embodiment of the present disclosure provides an electronic device, including one or more processors; a memory having one or more programs stored thereon; and one or more I/O interfaces connected between the processor and the memory and configured to enable information interaction between the processor and the memory. When the one or more programs are executed by the one or more processors, the one or more processors perform the above data search method.

In a fifth aspect, an embodiment of the present disclosure provides a non-transitory computer readable storage medium having a computer program stored thereon. When the computer program is executed by a processor, the above data search method is implemented.

According to the data search method, the data search apparatus, the system, the device and the non-transitory computer readable storage medium provided by the embodiments of the present disclosure, the timeliness requirement information of the search term is obtained through the analysis of the semantic-understanding information of the search term, and the acquisition mode of the resource result is obtained according to the obtained timeliness requirement information, so as to obtain the search result by using the acquisition mode. With the search method provided by the embodiment of the present disclosure, the timeliness of the search term can be analyzed and thus be accurately determined, so that the acquisition mode of the resource result matched with the timeliness of the search term can be selected, thereby achieving a balanced and win-win situation of the machine cost and the timeliness effect of a search engine.

BRIEF DESCRIPTION OF THE DRAWINGS

The accompanying drawings are intended to provide further understanding of the embodiments of the present disclosure, and are incorporated in and constitute a part of the Specification. The drawings, together with the embodiments of the present disclosure, are intended to explain the present disclosure, rather than limiting the present disclosure. With the detailed description of exemplary embodiments with reference to the drawings, the above and other features and advantages will become more apparent to those having ordinary skill in the art. In the drawings.

DETAILED DESCRIPTION

In order to enable those having ordinary skill in the art to better understand the technical solutions of the present disclosure, a method and an apparatus for data search, a system, a device and a non-transitory computer readable storage medium provided by the present disclosure are described in detail below with reference to the accompanying drawings.

Although exemplary embodiments will be described in more detail below with reference to the drawings, the exemplary embodiments can be embodied in various forms and should not be interpreted as limitation to the present disclosure. Rather, these embodiments are provided for facilitating thorough and complete understanding of the present disclosure, and enabling those having ordinary skill in the art to fully understand the scope of the present disclosure.

The embodiments and the features thereof in the present disclosure may be combined with one another if no conflict is incurred.

As used herein, the term "and/or" includes any and all combinations of one or more of the associated listed items.

The terms used herein are intended to describe specific embodiments, rather than limiting the present disclosure. Unless expressly indicated otherwise, the singular terms "a", "an" and "the" used herein are intended to include plural forms as well. It should also be understood that the terms "include" and/or "comprise", when used herein, specify the presence of the stated features, integers, steps, operations, elements, and/or components, but do not preclude the presence or addition of one or more other features, integers, steps, operations, elements, components, and/or the groups thereof.

Unless defined otherwise, all the terms (including technical and scientific terms) used herein have the same meaning as commonly understood by those having ordinary skill in the art. Unless expressly defined herein, the terms defined in generally used dictionaries should be interpreted as having the meanings given in the context of the related art and the present disclosure, and should not be interpreted as having idealized or overly formal meanings.

Figure 1:
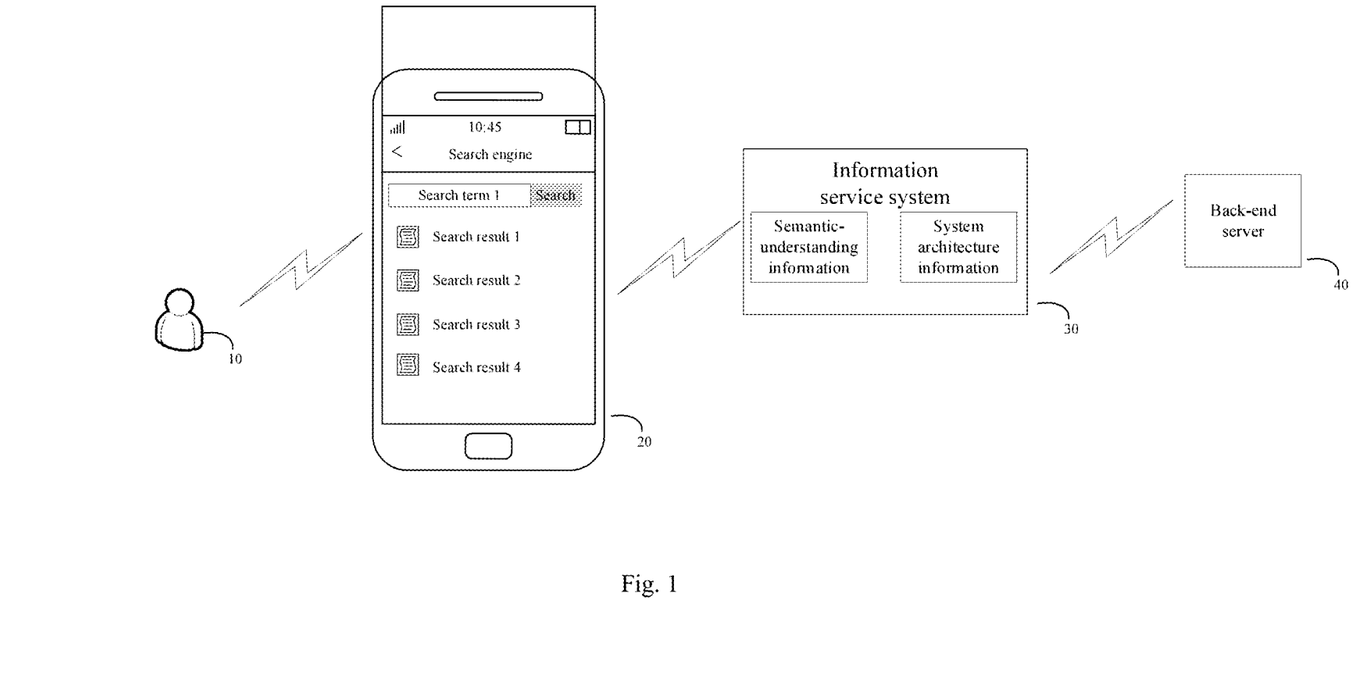
FIG. 1 is a schematic diagram illustrating a scenario according to an embodiment of the present disclosure.

FIG. 1 is a schematic diagram illustrating a scenario according to an embodiment of the present disclosure. In the scenario shown in FIG. 1, a user 10, a terminal 20, an information service system 30, and a back-end server 40 are provided, and a search engine application may be run in the terminal 20.

The user 10 may have access to the Internet by using the terminal 20 and run a search engine on the terminal 20 to search for a search term on the network. Illustratively, the terminal 10 may include, but is not limited to, a mobile phone, a personal computer, a tablet computer, a smart wearable device, a desktop computer, a laptop, and the like, all of which may be equipped with the search engine application and run the search engine application.

With reference to FIG. 1, the information service system 30 in the embodiment of the present disclosure may receive a search term input through the search engine, analyze semantic-understanding information and system information corresponding to the search term, and trigger a cache penetration process if it is indicated by the analysis that an updated resource result needs to be retrieved by penetrating a cache. The back-end server 40 may be configured to perform a recalling process, a sorting process, a fusion process and a data access process on the search term.

According to the description of FIG. 1, it can be understood that the information service system 30 in the embodiment of the present disclosure is a service system that is located between the fount-end search engine and the corresponding back-end server 40 and is configured to subject the search term obtained from the search engine to information processing, and determine whether to trigger the back-end server 40 to retrieve the latest resource result according to the processing result. In the following description of the embodiments, the information service system 30 may also be referred to as an information center system.

In some scenarios, when the search engine is used for searching, the resource results crawled according to the search term may be stored in a cache, and an expiration time is set for a penetration mechanism. A search result of the search term is retrieved from the resource results in the cache when the expiration time of penetration is not reached, and the latest resource result of the search term is retrieved through a penetration process when the expiration time of penetration is reached.

In those scenarios, for a penetration mechanism with a fixed expiration time of static configuration, the penetration is usually performed in an undifferentiated way based on the fixed expiration time, which cause a contradiction and a conflict between a machine cost and a timeliness effect, and make it hard to achieve a win-win situation.

For example, if more new resources are retrieved from the back-end by penetrating the cache during retrieval, the timeliness effect of the search result returned by the search engine is better, but the machine cost of the search engine is higher; on the contrary, if the resources are retrieved by directly hitting the cache during retrieval, the machine cost of the search engine is relatively low, but the timeliness effect of the search result returned by the search engine is badly affected.

Therefore, a control of the machine cost is usually sacrificed to improve the retrieval timeliness of the search engine, and the retrieval timeliness of the search engine is usually sacrificed to reduce the machine cost of the search engine.

The present disclosure provides a data search method, a data search apparatus, an information service system, an electronic device and a non-transitory computer readable storage medium, which uses semantic-understanding information and system information to jointly act on a penetration mechanism of a search system, so as to determine whether to perform the penetration process for the flow of a current search term.

It should be understood that all of the following embodiments may be applied to the system architecture of this embodiment. For the purpose of concise description, the following embodiments may be referred to and cited by each other.

Figure 2:
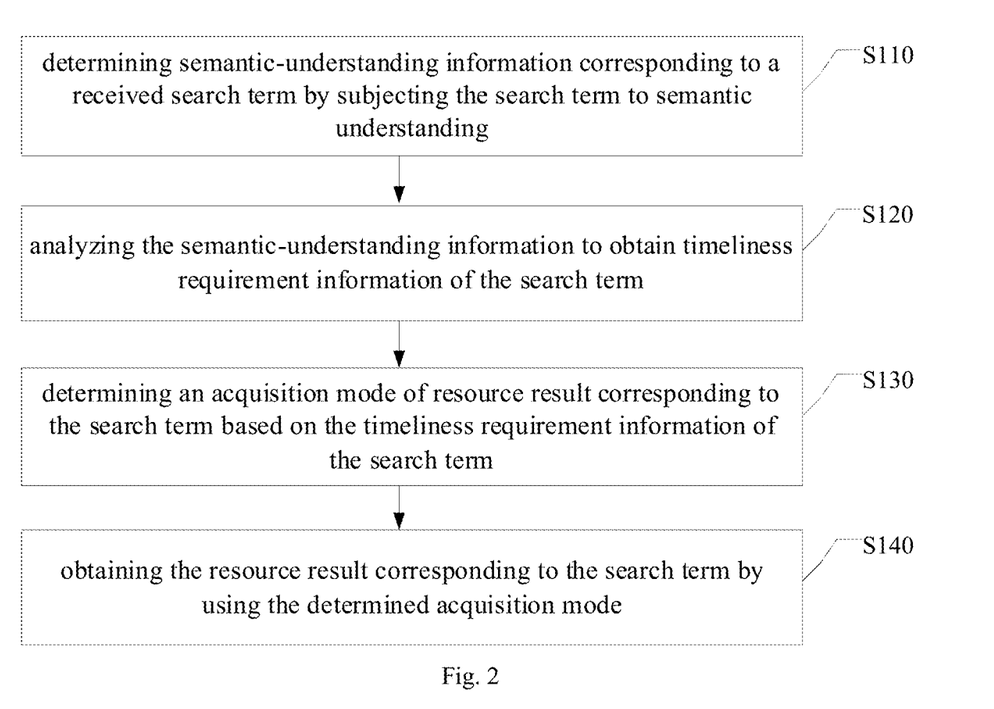
FIG. 2 is a flowchart illustrating a data search method according to an embodiment of the present disclosure.

FIG. 2 is a flowchart illustrating a data search method according to an embodiment of the present disclosure.

In a first aspect, with reference to FIG. 2, an embodiment of the present disclosure provides a data search method, which may include the following steps S110 to S140.

At step S110, determining semantic-understanding information corresponding to a received search term by subjecting the search term to semantic understanding.

At step S120, analyzing the semantic-understanding information to obtain timeliness requirement information of the search term.

At step S130, determining an acquisition mode of resource result corresponding to the search term based on the timeliness requirement information of the search term.

At step S140, obtaining the resource result corresponding to the search term by using the determined acquisition mode.

According to the data search method provided by the embodiment of the present disclosure, the timeliness requirement information of the search term can be obtained through the analysis of the semantic-understanding information of the search term, so that the timeliness of the search term can be analyzed and then accurately determined, so as to select an acquisition mode of resource result matched with the timeliness of the search term, thereby achieving a balanced and win-win situation of the machine cost and the timeliness effect of the search engine.

In some embodiments, the step S120 may include calculating the timeliness requirement information of the search term according to an information item in the semantic-understanding information and a preset weight coefficient corresponding to the information item in the semantic-understanding information.

The semantic-understanding information may include at least one of the following information items: literal meaning, semantic integrity and probability of burst keyword.

For example, for the search terms "Zhangsan divorced" and "Certain city earthquake", the timeliness requirement information of the search terms may be obtained by analyzing the literal meanings of the search terms. For example, it is highly probable that "Zhangsan divorced" is a low-timeliness requirement according to the literal meaning thereof, and that "Certain city earthquake" is a high-timeliness requirement according to the literal meaning thereof.

For example, the search term "A star's movie is released" has a high semantic integrity, while "A star's" has a low semantic integrity, therefore, "A star's movie is released" has a higher timeliness requirement than "A star's".

For example, a burst keyword may be understood as a keyword of an emergency or a keyword of a hot topic; and if it is detected that a first search term is the burst keyword and is received through manual search, and that a second search term is also the burst keyword but is received through machine search, a probability of burst keyword of the first search term is higher than that of the second search term, and the timeliness requirement of the first search term is also higher than that of the second search term.

In this embodiment, the timeliness requirement information of the search term may be determined according to one or a combination of the literal meaning, the semantic integrity and the probability of burst keyword.

In some embodiments, the step S130 may include determining, when a calculated value of the timeliness requirement information of the search term is greater than or equal to a preset first score, that the acquisition mode of resource result corresponding to the search term is triggering penetration of a preset cache to obtain an updated resource result, and determining, when the calculated value of the timeliness requirement information of the search term is less than the preset first score, that the acquisition mode of resource result corresponding to the search term is retrieving an existing resource result from the preset cache.

In this embodiment, the timeliness requirement information of the search term is obtained through the analysis of the semantic-understanding information of the search term, and the timeliness of the search term is accurately determined according to the value of the timeliness requirement information of the search term, so that the acquisition mode of resource result matched with the timeliness of the search term can be determined.

In some embodiments, the step S130 may include the following steps S11 to S13.

At step S11, determining system information corresponding to the search term.

At step S12, comprehensively analyzing timeliness and machine cost of the search term according to the timeliness requirement information and the system information of the search term to obtain a comprehensive analysis result of the search term.

At step S13, determining the acquisition mode of resource result corresponding to the search term according to the comprehensive analysis result of the search term.

In this embodiment, if a value of the comprehensive analysis result is greater than or equal to a preset second score, it is determined that the acquisition mode is triggering penetration of the preset cache to obtain the updated resource result; and if the value of the comprehensive analysis result is less than the preset second score, it is determined that the acquisition mode is retrieving the existing resource result from the preset cache.

The first score and the second score in the embodiments of the present disclosure may be preset empirical values, and may be the same as or different from each other, which is not specifically limited in the embodiments of the present disclosure.

By performing the steps S11 to S13, the comprehensive analysis of the timeliness and the machine cost of the search term can be performed according to a combination of the semantic-understanding information and the system information, so as to determine the acquisition mode of resource result matched with the current search term from the aspect of semantic-understanding information and the aspect of system information, thereby achieving a balanced and win-win situation of the machine cost and the timeliness effect of the search engine.

In some embodiments, the step S12 may include the following steps S21 to S23.

At step S21, calculating the timeliness requirement information of the search term according to an information item in the semantic-understanding information and a preset weight coefficient corresponding to the information item in the semantic-understanding information.

At step S22, calculating machine cost information of the search term according to an information item in the system information and a preset weight coefficient corresponding to the information item in the system information.

At step S23, obtaining the comprehensive analysis result of the search term according to a combination of the timeliness requirement information and the machine cost information of the search term.

By performing the steps S21 to S23, a score of each search term is obtained by subjecting the search term to weighted summation according to a combination of the semantic-understanding information, the system information, and the weight coefficients of the corresponding information items, and the acquisition mode of resource result corresponding to the search term is determined according to the score of the search term. In this way, the semantic-understanding information and the system information corresponding to the search term can be used to jointly act on a penetration mechanism of a search system to determine which processing mode is selected for the flow of the current search term from the aspect of semantic-understanding information and the aspect of system information, thereby achieving a balanced and win-win situation of the machine cost and the timeliness effect of the search engine.

After the timeliness requirement information of the search term is calculated in the step S120 or the step S21, the method may further include the following steps S31 to S33.

At step S31, determining retrieval-related information of the search term including at least one of a search frequency of the search term and a total number of recalled results corresponding to the search term.

At step S32, calculating timeliness-related information of the search term according to the retrieval-related information and a preset weight coefficient corresponding to the retrieval-related information.

At step S33, taking the obtained timeliness requirement information and the timeliness-related information of the search term as the timeliness requirement information of the search term.

By performing the steps S31 to S33, the timeliness requirement information of the search term can be determined according to a combination of the search frequency, the recall number and the semantic-understanding information of the search term.

In some embodiments, before the step S12, the data search method may further include the following step S30.

At step S30, preprocessing the timeliness information and the system information, with a preprocess including at least one of data normalization and feature standardization.

In this embodiment, the timeliness information and the system information can be converted to the same feature dimension through feature standardization, so as to be processed in the same feature dimension; and the values of the semantic-understanding information and the system information can be normalized to be between 0 and 1 through normalization, so that the preprocessed semantic-understanding information and the preprocessed system information are subjected to weighted summation according to the corresponding weight coefficients, so as to obtain the comprehensive analysis result of the search term.

In an embodiment of the present disclosure, before the step S120, the method may further include preprocessing an information item in the semantic-understanding information. The details of the preprocess of the information item are the same as those of the preprocess of the timeliness information in the step S30, and thus will not be repeated here.

In some embodiments, the resource result corresponding to the search term is a resource result corresponding to predetermined back-end process, and the preset cache is a cache corresponding to the predetermined back-end process.

In some embodiments, the acquisition mode of resource result includes retrieving an existing resource result from a preset cache and triggering penetration of the preset cache to obtain an updated resource result; the preset cache is a cache corresponding to a predetermined back-end process including at least one of the following processes: recall-layer process, sorting-layer process, fusion-layer process and access-layer process; and the preset cache includes at least one of the following caches: a fusion-layer cache and a sorting-layer cache.

In those embodiments, the different back-end processes may correspond to different information items in the semantic-understanding information, and may correspond to different information items in the system information. A search term is scored based on the weights of the information items in the semantic-understanding information corresponding to the different back-end processes and the weights of the information items in the system information corresponding to the different back-end processes, so as to obtain the scores of the search term corresponding to the predetermined back-end processes.

In some embodiments, a weight coefficient of the information item in the semantic-understanding information is determined according to the influence of the information item on the timeliness requirement information; and a weight coefficient corresponding to the information item in the system information is determined according to the influence of the information item on system performance.

In some embodiments, the information item in the system information includes at least one of system capacity, system response time, system response speed, system load, and total number of resource requests; and the system information corresponding to the back-end processes varies from each other, and the weight coefficient corresponding to the information item in the system information varies when the search term is searched for at different times.

In some embodiments, the weight coefficient of each information item in the semantic-understanding information and the weight coefficient of each information item in the system information may also be the empirical values set by a user in advance.

In some embodiments, the acquisition mode of resource result corresponding to the search term is one of the following modes: retrieving an existing resource result from a preset cache and triggering penetration of the preset cache to obtain an updated resource result.

According to the data search method provided by the embodiments of the present disclosure, the semantic-understanding information and the system information can be used to jointly act on a penetration mechanism of a search system, and the flow corresponding to a current search term of a current module in the system is scored to comprehensively determine whether to lead the current flow to the downstream by penetration, so as to always keep global optimization of the timeliness of results and a resource cost.

For providing a better understanding of the data search method of the present disclosure, an exemplary embodiment of the data search method of the present disclosure is described below with reference to FIG. 3, which is a schematic diagram of an architecture of a retrieval system according to an embodiment of the present disclosure. The same or equivalent components in FIG. 3 and FIG. 1 are presented by the same reference numerals.

Figure 3:
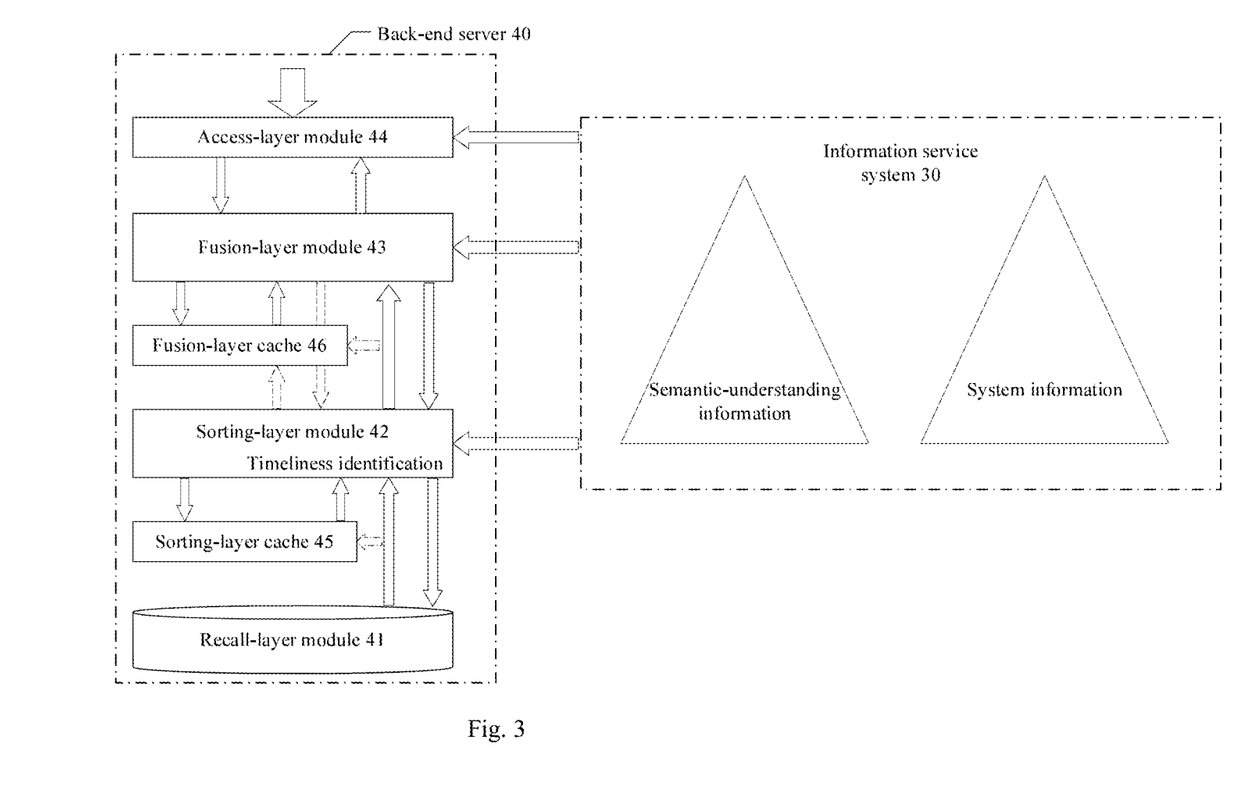
FIG. 3 is a schematic diagram of an architecture of a retrieval system according to an embodiment of the present disclosure.

As shown in FIG. 3, a back-end server 40 may include at least the following processing modules at a logic level: a recall-layer module 41, a sorting-layer module 42, a fusion-layer module 43, and an access-layer module 44. The back-end server 40 may further include a cache module, such as a sorting-layer cache 45 and a fusion-layer cache 46.

In practical application scenarios, the back-end server 40 may further include other layer modules at the logic level, and cache modules in other layers, which is not specifically limited in the embodiments of the present disclosure.

In some embodiments, the predetermined back-end process of the search engine may include at least one of the following processes: recall-layer process corresponding to the recall-layer module 41, sorting-layer process corresponding to the sorting-layer module 42, fusion-layer process corresponding to the fusion-layer module 43, and access-layer process corresponding to the access-layer module 44. The preset cache includes at least one of the following caches: the fusion-layer cache 46 and the sorting-layer cache 45.

For example, the recall-layer process may include performing a recalling process by a search engine for a received search term based on the existing search technology to obtain recalled search results; the sorting-layer process may include performing timeliness identification on the results of the search term recalled from the back-end, sorting the results of timeliness identification into an order from high timeliness to low timeliness to obtain a sorting-layer resource result corresponding to the search term, and storing the sorting-layer resource result in the sorting-layer cache;

the fusion-layer process may include fusing the sorting-layer resource result with preset display contents to obtain a fusion-layer resource result, and storing the fusion-layer resource result in the fusion-layer cache; and the access-layer process may include performing load balancing and disaster recovery on the retrieval of the search term.

Illustratively, in order to improve an access speed of a static web page, a search query may be forwarded to a plurality of servers in the access-layer process, so as to achieve load balancing.

With reference to FIG. 3, an information service system (i.e., an information center system) 30 may use semantic-understanding information and system information to jointly act on the penetration mechanisms of different layers of the back-end server of the search system.

In an embodiment of the present disclosure, the recall-layer module 41, the sorting-layer module 42, the fusion-layer module 43, and the access-layer module 44 of the back-end server 40 may have different penetration mechanisms.

That is, in this embodiment, both the semantic-understanding information and the system information in the information center system 30 may include a plurality of information items. Correspondingly, the recall-layer module 41, the sorting-layer module 42, the fusion-layer module 43, and the access-layer module 44 may respectively correspond to different information items in the semantic-understanding information and different information items in the system information, and the modules may implement the respective penetration mechanisms according to the corresponding semantic-understanding information items and system information items.

For simplifying the description, the data processing in the sorting-layer module shown in FIG. 3 is taken as an example in the following embodiment to illustrate a data processing method of search penetration mechanism of the back-end processing module based on an information center. However, the description should not be interpreted as a limitation to the scope or implementation possibilities of the present solution, and the processing methods of the back-end processing modules other than the sorting-layer module are consistent with that of the sorting-layer module.

In some embodiments, when applied to the sorting-layer module, the data processing method of search penetration mechanism based on an information service system may include the following steps S51 to S54.

At step S51, for the flow of a current search term, determining a semantic-understanding information item and a system information item corresponding to the sorting-layer module according to preset semantic-understanding information and system information in a constructed information service system At step S52, acquiring a weight coefficient of each semantic-understanding information item and a weight coefficient of each system information item.

At step S53, subjecting the semantic-understanding information item and the system information item corresponding to the sorting-layer module to weighted summation according to the acquired weight coefficient of each semantic-understanding information item and weight coefficient of each system information item to obtain a score of the current search term in the sorting-layer module.

At step S54, performing penetration for the flow of the search term when the score of the current search term in the sorting-layer module is greater than a preset first score.

For example, if the score is greater than the preset first score, it may be determined that the search term has a high timeliness requirement and it is necessary to perform penetration to obtain a latest recalled result; if the score is not greater than the first score, it is indicated that the search term has a low timeliness requirement or the current system architecture needs to be maintained with high performance, and thus it is unnecessary to perform the penetration.

By performing the steps S51-S54, it can be determined whether the search term is probably a high-timeliness requirement according to the literal meaning in the semantic-understanding information set, and it can be also comprehensively determined whether it is necessary to perform penetration to lead the current query to the downstream to obtain an updated source result according to the real-time capacity information of the system in the system information, so as to display the latest result to the user more quickly.

Figure 4:
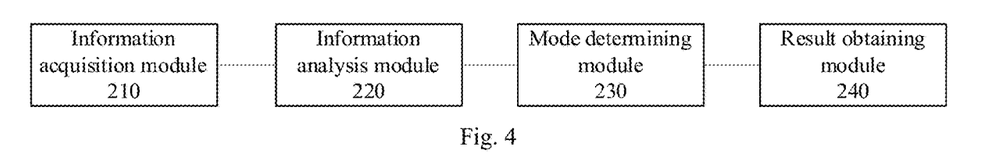
FIG. 4 is a block diagram of a data search apparatus according to an embodiment of the present disclosure.

FIG. 4 is a block diagram of a data search apparatus according to an embodiment of the present disclosure.

In a second aspect, with reference to FIG. 4, an embodiment of the present disclosure provides a data search apparatus, which may include the following modules.

An information acquisition module 210 is configured to determine semantic-understanding information corresponding to a received search term by subjecting the search term to semantic understanding.

An information analysis module 220 is configured to analyze the semantic-understanding information to obtain timeliness requirement information of the search term.

A mode determining module 230 is configured to determine an acquisition mode of resource result corresponding to the search term based on the timeliness requirement information of the search term.

A result obtaining module 240 is configured to obtain the resource result corresponding to the search term by using the determined acquisition mode.

According to the data search apparatus provided by the embodiment of the present disclosure, the timeliness requirement information of the search term can be obtained through the analysis of the semantic-understanding information of the search term, so that the timeliness of the search term can be analyzed and then accurately determined, so as to determine an acquisition mode of resource result matched with the timeliness of the search term, thereby achieving a balanced and win-win situation of the machine cost and the timeliness effect of the search engine.

In some embodiments, the information analysis module 220 is configured to calculate the timeliness requirement information of the search term according to an information item in the semantic-understanding information and a preset weight coefficient corresponding to the information item in the semantic-understanding information; and the semantic-understanding information includes at least one of the following information items: literal meaning, semantic integrity and probability of emergency keyword.

In some embodiments, the information acquisition module 210 is further configured to determine system information corresponding to the search term; the mode determining module 230 is further configured to comprehensively analyze timeliness and machine cost of the search term according to the timeliness requirement information and the system information of the search term to obtain a comprehensive analysis result of the search term; and the result obtaining module 240 is further configured to determine the acquisition mode of resource result corresponding to the search term according to the comprehensive analysis result of the search term.

In some embodiments, the information analysis module 220 is further configured to calculate the timeliness requirement information of the search term according to an information item in the semantic-understanding information and a preset weight coefficient corresponding to the information item in the semantic-understanding information, calculate the machine cost information of the search term according to an information item in the system information and a preset weight coefficient corresponding to the information item in the system information, and obtain the comprehensive analysis result of the search term according to a combination of the timeliness requirement information and the machine cost information of the search term.

In some embodiments, after being configured to calculate the timeliness requirement information of the search term, the information analysis module 220 is further configured to determine retrieval-related information of the search term including at least one of a search frequency of the search term and a total number of recalled results corresponding to the search term, calculate timeliness-related information of the search term according to the retrieval-related information and a preset weight coefficient corresponding to the retrieval-related information, and take the obtained timeliness requirement information and the timeliness-related information of the search term as the timeliness requirement information of the search term.

In some embodiments, the data search apparatus may further include a preprocessing module configured to preprocess the timeliness information and the system information before comprehensively analyzing the timeliness and the machine cost of the search term according to the timeliness requirement information and the system information of the search term, and a preprocess includes at least one of data normalization and feature standardization.

In some embodiments, the acquisition mode of resource result includes retrieving an existing resource result from a preset cache and triggering penetration of the preset cache to obtain an updated resource result; and the preset cache is a cache corresponding to a predetermined back-end process including at least one of the following processes: recall-layer process, sorting-layer process, fusion-layer process and access-layer process; and the preset cache includes at least one of the following caches: a fusion-layer cache and a sorting-layer cache.

In some embodiments, the information item in the system information includes at least one of system capacity, system response time, system response speed, system load, and total number of resource requests; and the different back-end processes correspond to different information items in the semantic-understanding information, and also correspond to different information items in the system information, and the weight coefficient corresponding to an information item in the system information varies when the search term is searched for at different times.

According to the data search apparatus provided by the embodiments of the present disclosure, each search term can be comprehensively analyzed according to a combination of the semantic-understanding information and the system information, and it is determined according to the comprehensive analysis result whether to hit a cache for the current search query so as to directly return a resource result from the corresponding cache, or to perform penetration so as to obtain an updated resource result corresponding to the search term, thereby achieving a balanced and win-win situation of the machine cost and the timeliness effect of the search engine.

Figure 5:
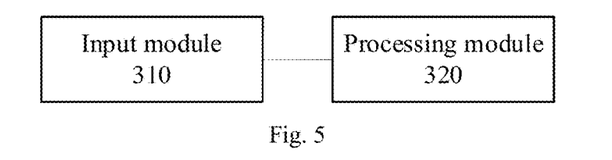
FIG. 5 is a block diagram of an information service system according to an embodiment of the present disclosure.

In a third aspect, with reference to FIG. 5, an embodiment of the present disclosure provides an information service system, including an input module 310 configured to receive an input search term; and a processing module 320 configured to perform the data search method provided by the embodiments of the present disclosure on the received search term, and obtain an acquisition mode of resource result corresponding to the search term and the resource result.

According to the information service system constructed by the embodiment of the present disclosure, the semantic-understanding information and the system information can be used to jointly act on a penetration mechanism of a search system to comprehensively analyze each flow in a current module of the system, thereby achieving a balanced and win-win situation of machine cost and timeliness effect.

In a practical application scenario, before the information center system provided by the embodiment of the present disclosure is implemented, for an input search term, such as "employment service platform of All-China Federation of Trade Unions", a search system, which adopts a fixed expiration time of static configuration, usually performs penetration in an undifferentiated way based on the fixed expiration time, and the obtained search result of the search term is not the latest resource result.

When the information center system is implemented, for a search term that contains quite a few characters and is seldom searched for, such as "employment service platform of All-China Federation of Trade Unions", by performing the data search method provided by the embodiments of the present disclosure, the search term is scored according to a combination of the semantic-understanding information and the system information, so that it can be quickly recognized, according to the score, the time when the search term has become a burst search term having certain timeliness, and finally the latest resource result is displayed to the user, thereby achieving a balanced and win-win situation of the machine cost and the timeliness effect of the search engine.

According to the data search method, the data search apparatus, the system, the device and the non-transitory computer readable storage medium provided by the embodiments of the present disclosure, an information center system can be constructed, multidimensional information corresponding to a search term can be obtained, and the data flow corresponding to the search term can be intelligently enabled and be subjected to dynamic penetration, which not only greatly saves the machine cost, but also makes the timeliness of the search term outstanding in terms of overall burst effect, main demand burst effect and secondary demand burst effect, thereby achieving a balanced and win-win situation of the machine cost and the timeliness effect of the search engine.

It should be understood that the present disclosure is not limited to the particular configurations and processes described in the above embodiments and illustrated in the drawings. For simplifying the description, a specific process of the data search method performed by the data processing module may be found in the description of the corresponding process of the data search method in the above method embodiments, and is not repeated here.

Figure 6:
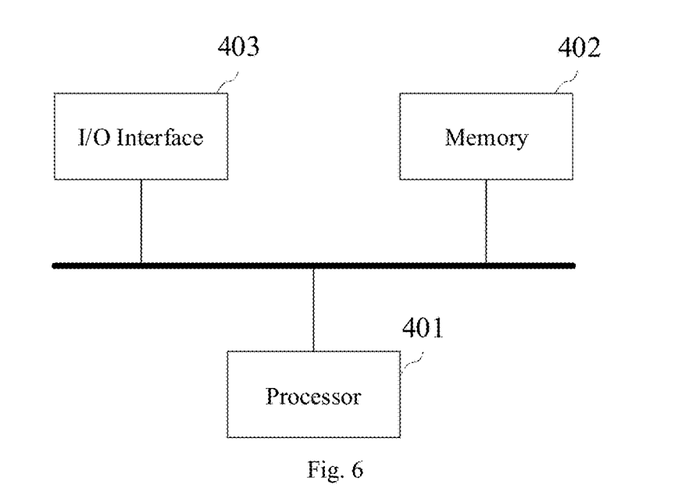
FIG. 6 is a block diagram of an electronic device according to an embodiment of the present disclosure.

In a fourth aspect, with reference to FIG. 6, an embodiment of the present disclosure provides an electronic device, including: one or more processors 401; a memory 402 having one or more programs stored thereon, when the one or more programs are executed by the one or more processors, the one or more processors perform the above data search method; and one or more I/O interfaces 403 connected between the processor and the memory and configured to enable information interaction between the processor and the memory.

The processor 401 is a device having a data processing capability, and includes, but is not limited to, a central processing unit (CPU), etc. The memory 402 is a device having a data storage capability, and includes, but is not limited to, a random access memory (RAM, more specifically, such as a synchronous dynamic RAM (SDRAM), a double data rate SDRAM (DDR SDRAM), etc.), a read-only memory (ROM), an electrically erasable programmable read-only memory (EEPROM), and a flash memory (FLASH). The I/O interface (read/write interface) 403 is connected between the processor 401 and the memory 402, enables the information interaction between the processor 401 and the memory 402, and includes, but is not limited to, a data bus.

In some embodiments, the processor 401, the memory 402, and the I/O interface 403 are connected to each other through a bus, so as to be further connected to other components of the electronic device.

Figure 7:
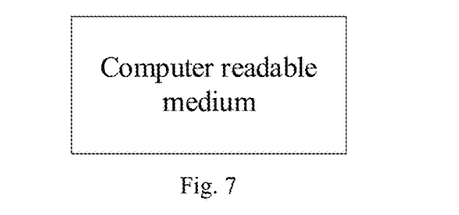
FIG. 7 is a block diagram of a non-transitory computer readable storage medium according to an embodiment of the present disclosure.

In a fifth aspect, with reference to FIG. 7, an embodiment of the present disclosure provides a non-transitory computer readable storage medium having a computer program stored thereon. When the computer program is executed by a processor, the above data search method is implemented.

It should be understood by those having ordinary skill in the art that the functional modules/units in all or some of the steps, systems, and devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). As well known by those having ordinary skill in the art, the term "computer storage media" includes volatile/nonvolatile and removable/non-removable media used in any method or technology for storing information (such as computer-readable instructions, data structures, program modules and other data). The computer storage media include, but are not limited to, RAM, ROM, EEPROM, flash memory or other memory techniques, CD-ROM, digital versatile disk (DVD) or other optical discs, magnetic cassette, magnetic tape, magnetic disk or other magnetic storage devices, or any other media which can be used to store the desired information and can be accessed by a computer. In addition, it is well known by those having ordinary skill in the art that the communication media generally include computer-readable instructions, data structures, program modules or other data in a modulated data signal, such as a carrier wave or other transmission mechanism, and may include any information delivery media.

It should be understood that both the exemplary embodiments and the specific terms disclosed in the present disclosure are for the purpose of illustration, rather than for limiting the present disclosure. It is obvious to those having ordinary skill in the art that the features, characteristics and/or elements described in connection with a particular embodiment may be used alone or in combination with the features, characteristics and/or elements described in connection with other embodiments in some examples, unless expressly indicated otherwise. Therefore, it should be understood by those having ordinary skill in the art that various changes in form and detail may be made without departing from the scope of the present disclosure as set forth in the appended claims.

What is claimed is:

1. A data search method, comprising:
   determining semantic-understanding information corresponding to a received search term by subjecting the search term to semantic understanding;
   analyzing the semantic-understanding information to obtain timeliness requirement information of the search term;
   determining an acquisition mode of resource result corresponding to the search term based on the timeliness requirement information of the search term; and
   obtaining the resource result corresponding to the search term by using the determined acquisition mode,
   wherein the acquisition mode of resource result comprises a mode of retrieving an existing resource result from a preset cache and a mode of triggering penetration of the preset cache to obtain an updated resource result from a back end,
   wherein the step of analyzing the semantic-understanding information to obtain the timeliness requirement information of the search term comprises:
   calculating the timeliness requirement information of the search term according to an information item in the semantic-understanding information and a preset weight coefficient corresponding to the information item in the semantic-understanding information, wherein the semantic-understanding information comprises at least one of the following information items: literal meaning, semantic integrity and probability of burst keyword, and
   wherein the step of determining the acquisition mode of resource result corresponding to the search term based on the timeliness requirement information of the search term comprises:
   determining, when a calculated value of the timeliness requirement information of the search term is greater than or equal to a preset first score, that the acquisition mode of resource result corresponding to the search term is the mode of triggering penetration of the preset cache to obtain the updated resource result from the back end, and
   determining, when the calculated value of the timeliness requirement information of the search term is less than the preset first score, that the acquisition mode of resource result corresponding to the search term is the mode of retrieving the existing resource result from the preset cache.

2. The method of claim 1, wherein the step of determining the acquisition mode of resource result corresponding to the search term based on the timeliness requirement information of the search term comprises:
   determining system information corresponding to the search term;
   comprehensively analyzing timeliness and machine cost of the search term according to the timeliness requirement information and the system information of the search term to obtain a comprehensive analysis result of the search term; and determining the acquisition mode of resource result corresponding to the search term according to the comprehensive analysis result of the search term.

3. The method of claim 2, wherein the step of comprehensively analyzing the timeliness and the machine cost of the search term according to the timeliness requirement information and the system information of the search term to obtain the comprehensive analysis result of the search term comprises:

calculating the timeliness requirement information of the search term according to an information item in the semantic-understanding information and a preset weight coefficient corresponding to the information item in the semantic-understanding information;

calculating machine cost information of the search term according to an information item in the system information and a preset weight coefficient corresponding to the information item in the system information; and obtaining the comprehensive analysis result of the search term according to a combination of the timeliness requirement information and the machine cost information of the search term.

4. The method of claim 1, after calculating the timeliness requirement information of the search term, further comprising:

determining retrieval-related information of the search term comprising at least one of a search frequency of the search term and a total number of recalled results corresponding to the search term;

calculating timeliness-related information of the search term according to the retrieval-related information and a preset weight coefficient corresponding to the retrieval-related information; and taking the obtained timeliness requirement information and the timeliness-related information of the search term as the timeliness requirement information of the search term.

5. The method of claim 2, before comprehensively analyzing the timeliness and the machine cost of the search term according to the timeliness requirement information and the system information of the search term, further comprising:

preprocessing the timeliness information and the system information, wherein a preprocess comprises at least one of data normalization and feature standardization.

6. The method of claim 3, before comprehensively analyzing the timeliness and the machine cost of the search term according to the timeliness requirement information and the system information of the search term, further comprising:

preprocessing the timeliness information and the system information, wherein a preprocess comprises at least one of data normalization and feature standardization.

7. The method of claim 1, wherein the preset cache is a cache corresponding to a predetermined back-end process comprising at least one of the following processes: recall-layer process, sorting-layer process, fusion-layer process and access-layer process; and the preset cache comprises at least one of the following caches: a fusion-layer cache and a sorting-layer cache.

8. The method of claim 7, wherein the information item in the system information comprises at least one of system capacity, system response time, system response speed, system load, and total number of resource requests; and the different back-end processes correspond to different information items in the semantic-understanding information, and also correspond to different information items in the system information, and the weight coefficient corresponding to an information item in the system information varies when the search term is searched for at different times.

9. The method of claim 2, wherein the preset cache is a cache corresponding to a predetermined back-end process comprising at least one of the following processes: recall-layer process, sorting-layer process, fusion-layer process and access-layer process; and the preset cache comprises at least one of the following caches: a fusion-layer cache and a sorting-layer cache.

10. The method of claim 9, wherein the information item in the system information comprises at least one of system capacity, system response time, system response speed, system load, and total number of resource requests; and the different back-end processes correspond to different information items in the semantic-understanding information, and also correspond to different information items in the system information, and the weight coefficient corresponding to an information item in the system information varies when the search term is searched for at different times.

11. The method of claim 3, wherein the preset cache is a cache corresponding to a predetermined back-end process comprising at least one of the following processes: recall-layer process, sorting-layer process, fusion-layer process and access-layer process; and the preset cache comprises at least one of the following caches: a fusion-layer cache and a sorting-layer cache.

12. The method of claim 11, wherein the information item in the system information comprises at least one of system capacity, system response time, system response speed, system load, and total number of resource requests; and the different back-end processes correspond to different information items in the semantic-understanding information, and also correspond to different information items in the system information, and the weight coefficient corresponding to an information item in the system information varies when the search term is searched for at different times.

13. A data search apparatus, comprising:

an information acquisition module configured to determine semantic-understanding information corresponding to a received search term by subjecting the search term to semantic understanding;

an information analysis module configured to analyze the semantic-understanding information to obtain timeliness requirement information of the search term;

a mode determining module configured to determine an acquisition mode of resource result corresponding to the search term based on the timeliness requirement information of the search term; and a result obtaining module configured to obtain the resource result corresponding to the search term by using the determined acquisition mode, wherein the acquisition mode of resource result comprises a mode of retrieving an existing resource result from a preset cache and a mode of triggering penetration of the preset cache to obtain an updated resource result from a back end, wherein the information analysis module is configured to:
calculate the timeliness requirement information of the search term according to an information item in the semantic-understanding information and a preset weight coefficient corresponding to the information item in the semantic-understanding information, wherein the semantic-understanding information comprises at least one of the following information items: literal meaning, semantic integrity and probability of burst keyword, and wherein the mode determining module is configured to:
determine, when a calculated value of the timeliness requirement information of the search term is greater than or equal to a preset first score, that the acquisition mode of resource result corresponding to the search term is the mode of triggering penetration of the preset cache to obtain the updated resource result from the back end, and determine, when the calculated value of the timeliness requirement information of the search term is less than the preset first score, that the acquisition mode of resource result corresponding to the search term is the mode of retrieving the existing resource result from the preset cache.

14. An information service system, comprising:
an input module configured to receive an input search term; and
a processing module configured to perform the data search method of claim 1 on the received search term, and obtain an acquisition mode of resource result corresponding to the search term and the resource result.

15. An electronic device, comprising:
one or more processors;
a memory having one or more programs stored thereon, wherein the one or more processors perform the data search method of claim 1 when the one or more programs are executed by the one or more processors; and
one or more I/O interfaces connected between the processor and the memory and configured to enable information interaction between the processor and the memory.

16. A non-transitory computer readable storage medium having a computer program stored thereon, wherein the data search method of claim 1 is implemented when the computer program is executed by a processor.

* * * * *